United States Patent

Rien

[11] Patent Number: 6,095,903
[45] Date of Patent: Aug. 1, 2000

[54] METHOD AND DEVICE FOR THE MECHANICAL REMOVAL OF A LAYER OF ALIEN MATERIAL FROM A BASIC MATERIAL

[75] Inventor: Willi Rien, Langenhagen, Germany

[73] Assignee: U.S. Philips Corporation, New York, N.Y.

[21] Appl. No.: 08/940,829

[22] Filed: Sep. 30, 1997

[30] Foreign Application Priority Data

Oct. 4, 1996 [DE] Germany ............... 196 40 945

[51] Int. Cl.[7] ............... B24B 1/00; B24C 1/00
[52] U.S. Cl. ............... 451/38; 451/28
[58] Field of Search ............... 451/39, 40, 41, 451/88, 89, 29, 30, 103

[56] References Cited

U.S. PATENT DOCUMENTS

| | | | |
|---|---|---|---|
| 4,519,812 | 5/1985 | Brull et al. | 451/88 |
| 4,648,214 | 3/1987 | Brull et al. | 451/88 |
| 4,958,466 | 9/1990 | Howells | 451/88 |
| 5,009,240 | 4/1991 | Levi | 451/39 |
| 5,099,618 | 3/1992 | Schmid | 451/63 |
| 5,147,466 | 9/1992 | Ohmori et al. | 451/39 |
| 5,261,191 | 11/1993 | Wick | 51/320 |
| 5,315,793 | 5/1994 | Peterson et al. | 451/89 |
| 5,390,450 | 2/1995 | Goenka | 451/53 |
| 5,512,106 | 4/1996 | Tamai et al. | 451/39 |
| 5,520,571 | 5/1996 | Brown et al. | 451/88 |
| 5,571,041 | 11/1996 | Leikam | 451/63 |
| 5,571,335 | 11/1996 | Lloyd | 451/39 |
| 5,573,446 | 11/1996 | Dey et al. | 451/39 |
| 5,632,150 | 5/1997 | Henzler | 451/39 |
| 5,637,027 | 6/1997 | Palombo et al. | 451/39 |

FOREIGN PATENT DOCUMENTS

| | | |
|---|---|---|
| 0332886A2 | 9/1989 | European Pat. Off. . |
| 3816561C1 | 3/1989 | Germany . |
| 4123199C2 | 1/1993 | Germany . |
| 4402247A1 | 7/1994 | Germany . |
| 4403173A1 | 8/1995 | Germany . |
| 06091652 | 4/1994 | Japan . |

OTHER PUBLICATIONS

"Green Tech, Industriereinigung Ohne Chemie" (Industrial Cleaning Without Chemicals).

*Primary Examiner*—Derris H. Banks
*Attorney, Agent, or Firm*—Michael E Belk

[57] ABSTRACT

A method for mechanical removal of a layer of alien material from a basic material of a disc-shaped optically readable information carrier. The layer of alien materials is removed from the basic material by a jet of deep-frozen particles applied under pressure.

20 Claims, 1 Drawing Sheet

METHOD AND DEVICE FOR THE MECHANICAL REMOVAL OF A LAYER OF ALIEN MATERIAL FROM A BASIC MATERIAL

FIELD OF THE INVENTION

The invention is related to the field of disc-shaped record carrier manufacture.

BACKGROUND OF THE INVENTION

The invention relates to a method for the mechanical removal of a layer of alien material from a basic material of a disc-shaped information carrier, in particular an optically readable information carrier. The invention also relates to a device for carrying out this method.

High-quality synthetic resins, for example polycarbonate, are used in the manufacture of disc-shaped information carriers with a high storage density, for example optically readable digital audio discs (CDs) because of the high requirements imposed on the dimensional stability of such discs. The reject rate in the manufacture of such information discs is comparatively high in practice. To reduce waste, the basic material for the disc-shaped information carrier, usually polycarbonate, is recovered. This is done in a recycling process in which the polycarbonate is once more used in granulate form for the manufacture of the disc-shaped information carriers. To achieve this, the alien materials present on the basic material of the information disc must be removed in a reliable manner in order to achieve the purity required for re-use.

The layer of alien material present on the basic material of the information disc usually comprises a thin aluminum layer lying on the basic material, a radiation-cured acrylate lying on the aluminum layer, and one or several layers of colored print lying on the acrylate.

A method of the kind mentioned in the opening paragraph is known from, for example, DE 41 23 199 C2. In this known method, the layer of alien material is removed from the basic material by means of a material-removing cutting operation carried out parallel to the surface of the information carrier. This method requires a special machine adapted thereto. Furthermore, this machine must be so designed that the layers of alien material provided at the end faces of the information disc are also removed. The material losses may amount to up to 20% here.

The document cited above describes additional possibilities for removing layers from such information discs. It is thus possible, for example, first to dissolve the layer of alien material in a chemical process and subsequently to remove it. A disadvantage of this is the creation of a large quantity of dissolved wastes whose disposal involves much cost and effort. The cited document furthermore describes a mechanical process in which the layer of alien material is removed through the use of a jet of particles or an abrasive substance, which grinds off the alien material. Such a method is described, for example, in DE 38 16 651 C1 for the repair of damaged protective layers of a compact disc. This method is uneconomical owing to the loss of large quantities of blasting agents.

The brochure "GREEN TECH, Industriereinigung ohne Chemie" (Industrial Cleaning Without Chemicals) discloses a method and an appliance for cleaning of various materials, for example for cleaning metal, synthetic resin, stone, glass, or for cleaning electrical components. Dry ice (frozen carbon dioxide, $CO_2$) is blasted onto the impurities by means of compressed air in this method. The carbon dioxide, concentrated into pellets of dry ice the size of a rice grain in a special process, works itself through the impurity during this. The polluted surfaces can be cleaned without residues very quickly in this way.

The above citations are hereby incorporated in whole by reference.

SUMMARY OF THE INVENTION

The invention has for its object, to simplify the method of the kind mentioned in the opening paragraph.

According to the invention, this object is achieved in that the layer comprising the alien materials is removed from the basic material by a jet of deep-frozen particles which is applied under pressure. The application of the deep-frozen particles to the layer of alien material leads to internal stresses in the layer of alien material by which the adhesion between the layer of alien material and the basic material is reduced. Since the particles are also provided under pressure, the portions thus loosened are removed from the basic material in a simple manner. No residues of any kind remain on the basic material which is to be recovered for renewed use, so that the basic material thus cleaned is immediately available for re-use.

An embodiment of the invention is characterized by the use of metal particles. This method has the advantage that the metal particles used for cleaning can be reused after the process of cleaning the basic material and after a suitable preparation, cleaning, and separation from particles of the alien substances.

A further embodiment of the invention is characterized by the use of synthetic-resin particles, which can also be re-used after the process of cleaning the basic material and after a suitable preparation process.

A further embodiment of the invention is characterized by a round, preferably spherical surface of the particles made from metal or synthetic resin. This construction will suffice when the bond between the layer and the basic material is not too strong.

A further embodiment of the invention is characterized by the use of particles with sharp edges. This construction has the advantage that the particles applied under pressure cut through the layer very quickly, so that the interface between the layer and the basic material is exposed very quickly and the jet can thus be active immediately. A certain degree of damage to the basic material, however, should be taken into account here.

A further embodiment of the invention is characterized in that the particles are cooled down to a low temperature necessary for the removal process before they are used. The particles are preferably cooled to approximately minus 190° C. in a nitrogen bath.

A further embodiment of the invention is characterized in that the particles are divested of the alien material residues after their use and are regenerated in a special process.

A further embodiment of the invention is characterized by the use of dry ice (frozen carbon dioxide, $CO_2$) which has a temperature of approximately −80° C. This method, which is known per se for industrial cleaning and which is described in the brochure cited above, has the advantage that the layer can be removed without moisture and without appreciable damage to the basic material. A further advantage of cleaning with dry ice is that no residues of any kind caused by the cleaning agent are left over because the dry ice pellets evaporate after hitting the basic material.

Those skilled in the art will understand the invention and additional objects and advantages of the invention by studying the description of preferred embodiments below with reference to the following drawings which illustrate the features of the appended claims:

DETAILED DESCRIPTION OF THE PREFERRED EMBODIMENT

Figure 2:
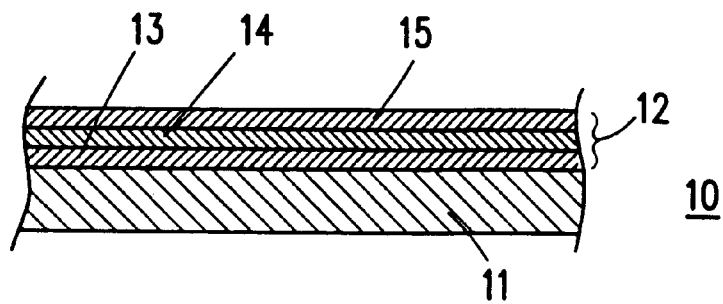
FIG. 2 is a diagrammatic cross-section of the CD which is not true to scale.

The CD 10 in FIG. 2, comprises a disc-shaped carrier 11 of polycarbonate as a basic material, and a layer 12 comprising alien materials and provided on this carrier 11. The layer 12 of alien materials comprises a thin aluminum layer 13 provided on the carrier 11, a protective UV lacquer layer 14 provided on the layer 13, and a color layer 15, for example a picture 15a or a legend provided on the protective lacquer layer 14.

Figure 1:
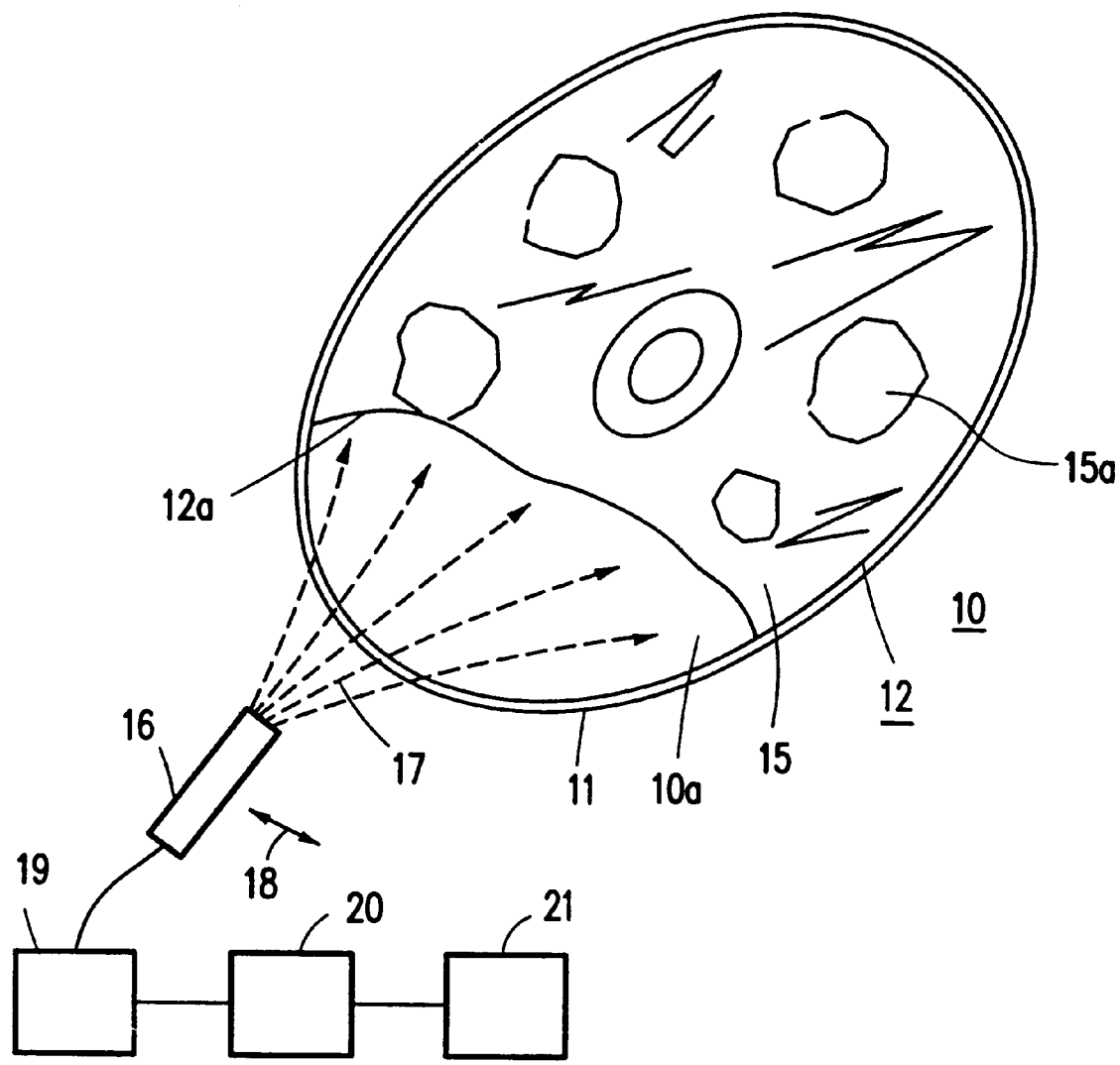
FIG. 1 is a perspective view of a commercially available CD and the system of the invention.

A nozzle 16 is diagrammatically shown in FIG. 1, from which a jet of particles 17 emerges at high pressure, aimed at the layer 12 of alien materials. It is evident from FIG. 1 that the region 10a of the CD 10 has already been divested of the layer 12 of alien material by the jet of particles 17. The layer 12 of alien materials can be removed very easily from the carrier 11 by aiming the jet of particles 17, at an edge 12a formed by the layer 12, and moving the jet of particles 17. The nozzle 16 can be moved to and fro in directions 18, as desired. The system includes a reservoir 19 for the particles 17, a gas compressor 20, an appliance 21 for deep-freezing the particles a device 22 for automatically positioning the disc with respect to the jet, an apparatus 23 for providing the carriers of basic material coated with alien material, and an apparatus 24 for recovering the basic material preferably in granulate form, and supplying it to providing apparatus 23. Recovering apparatus may also include means for recovering metal or resin particles. The appliance 21 includes a nitrogen bath with a temperature of approximately −190° C. and apparatus to provide particles of dry ice. Alternately, the appliance 21 may cool resin particles or metal particles or may not be required for such particles.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

What is claimed is:

1. A method for manufacturing an optically readable information carrier, comprising the steps of:
   providing an optically readable information carrier, the information carrier including a basic material and a coating of alien material over the basic material; and
   removing the layer of alien material from the basic material using a jet of deep-frozen particles applied under pressure.

2. The method as claimed in claim 1, wherein the deep-frozen particles include metal particles.

3. The method as claimed in claim 1, wherein the deep-frozen particles include synthetic-resin particles.

4. The method of claim 1, wherein the deep-frozen particles include particles with a round surface.

5. The method of claim 1, wherein the deep-frozen particles include particles with sharp edges.

6. The method of claim 1, wherein the particles are cooled down to a low temperature necessary for the removal of the alien layer before the particles are applied.

7. The method as claimed in claim 6, further comprising the step of deep-freezing the particles in a nitrogen bath with a temperature of approximately −190° C.

8. The method of claim 1, further comprising the step of divesting the alien material from the particles after using the particles and regenerating the particles in a process.

9. The method as claimed in claim 1, wherein the deep-frozen particles include dry ice.

10. The method of claim 1, wherein the basic material includes thermoplastic resin and the alien material includes a metal layer.

11. The method of claim 1, further including the step of rejecting the information carrier if the information carrier is defective after the step of coating, wherein the step of removing is performed if the information carrier is rejected.

12. Apparatus for manufacturing disc-shaped optically readable information carriers of basic material coated with alien material, comprising:
   means for providing optically readable information carriers, the information carriers including basic material and a coating of alien material over the basic material;
   a container for accommodating particles;
   a compressor; and
   a nozzle arrangement communicating with the container, and the compressor, with means for generating a jet of particles for divesting the coating of alien material from the basic material of the information carriers.

13. The apparatus of claim 12, wherein the particles are selected from the group consisting of metal, synthetic resin, and dry ice.

14. The apparatus of claim 12, wherein the coating of alien material includes a layer of metal and the basic material includes thermoplastic resin.

15. Apparatus for manufacturing disc-shaped optically readable information carriers of basic material coated with alien material, comprising:
   a container for accommodating particles;
   a compressor;
   a nozzle arrangement communicating with the container, and the compressor, with means for generating a jet of particles for divesting the coating of alien material from the basic material of the information carriers;
   means for segregating the particles from the alien material;
   means for recovering and reusing the segregated particles;
   means for cooling for providing deep-frozen particles;
   means for providing information carriers of basic material coated with alien material;
   means for moving the jet with respect to the information carriers; and
   means for recovering the basic material in granular form and supplying the basic material to the means for providing information carriers;
   and in which:
      the appliance includes means for providing particles of dry ice;
      the means for moving the jet include means for automatically moving the jet back and forth aimed at an edge between a region of the basic material coated with alien material and a region of the basic material divested of the coating of alien material; and the appliance includes a liquid nitrogen bath; and the basic material includes thermoplastic resin and the alien coating includes a metal layer.

16. A method for manufacturing an optically readable information carrier, comprising the steps of:

providing an optically readable information carrier, the information carrier including a basic material and a coating of alien material over the basic material;

removing the alien material by applying a jet of particles under pressure; and segregating the alien material from the particles.

17. The method of claim 16, wherein the basic material includes thermoplastic resin and the alien material includes a layer of metal.

18. The method of claim 16, wherein the particles are selected from the group consisting of metal, synthetic resin, and dry ice.

19. The method of claim 16, further including the step of rejecting the information carrier if the information carrier is defective after the step of coating, wherein the step of removing is performed if the information carrier is rejected.

20. A method for manufacturing an optically readable information carrier, comprising the steps of:

providing a carrier including a basic material and a coating of alien material over the basic material;

removing the alien material by applying a jet of particles under pressure; and segregating the alien material from the particles;

in which:

the segregated particles are reused in the removing step; and the basic material is an opaque thermoplastic resin and the alien material includes a layer of metal.

* * * * *